United States Patent [19]
Dobbert

[11] 3,751,764
[45] Aug. 14, 1973

[54] CASING SIZER
[75] Inventor: Arnold E. Dobbert, Fremont, Calif.
[73] Assignee: Rheem Manufacturing Company, New York, N.Y.
[22] Filed: Mar. 31, 1971
[21] Appl. No.: 129,922

[52] U.S. Cl. ............................................. 17/35, 17/41
[51] Int. Cl. .............................................. A22c 11/02
[58] Field of Search ...................... 17/33, 34, 35, 41

[56] References Cited
UNITED STATES PATENTS
3,140,509 7/1964 Muller ..................................... 17/33
3,396,426 8/1968 Ziolko ..................................... 17/35
3,010,144 11/1961 Kochjohann ............................ 17/34
3,454,980 7/1969 Washburn ............................... 17/35

Primary Examiner—Lucie H. Laudenslager
Attorney—Gordon Wood

[57] ABSTRACT

A casing sizer including an annular resilient ring provided with a radially deformable portion and adjustment means for compressing said portion radially inwardly to increase the frictional drag on the casing and therefore the size of the stuffed sausage. A swingable mount is provided for disconnecting the sizer from the stuffing horn when desired.

2 Claims, 4 Drawing Figures

PATENTED AUG 14 1973

3,751,764

INVENTOR.
ARNOLD E. DOBBERT
BY
Gordon Wood.

CASING SIZER

This invention relates to casing sizers for controlling the size of stuffed sausage products.

Heretofore most sizers for analogous purposes have been designed to compress the moving casing between members that are supported for relative movement in an axial direction relative to the stuffing horn. By adjusting the pressure between such members the drag on the casing may be changed thereby permitting the size of the stuffed sausage to be regulated. Automatic regulation of the size of the stuffed sausage has also been attempted by causing the pressure between the axially movable members to be regulated by the stuffed sausage. Examples of prior art structures incorporating such a design can be found in U. S. Pat. Nos. 3,454,980 and 3,545,038.

Since it is desirable to be able, manually, to very accurately control the drag on the casing for a particular product being run the main object of the present invention is the provision of a novel casing sizer which is relatively simple in construction and inexpensive to manufacture compared to analogous devices in the prior art.

Another object of the invention is the provision of a novel casing sizer having a readily actuated adjustment means which can be actuated while the stuffing operation is being carried out and which may be very closely adjusted depending on the product being run so as to give optimum uniformity in size and quality of such product.

Other objects and advantages of the present invention will be seen from the following specification and from the drawings.

Figure 1:
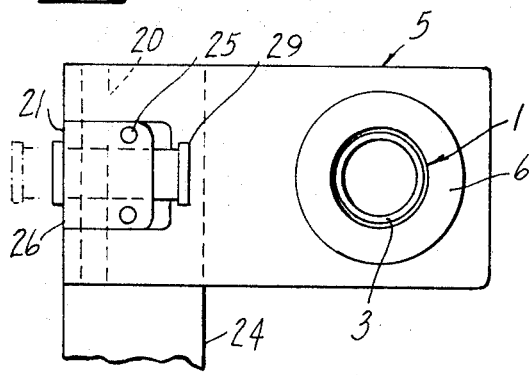
FIG. 1 is an end elevation of the stuffing horn showing a preferred embodiment of the present invention set up with respect thereto.
Figure 2:
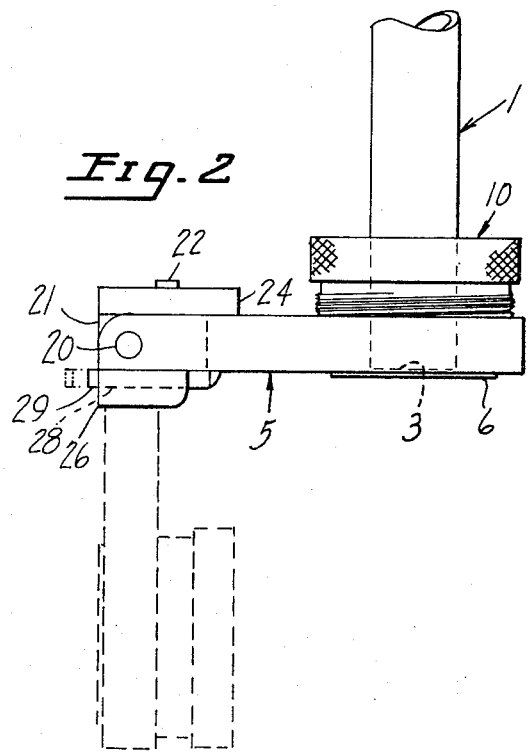
FIG. 2 is a top plan view of the structure of FIG. 1.

In detail, and first with reference to FIGS. 1 and 2 the invention is adapted to be employed with a stuffing horn 1 which is connected at one end with a stuffer (not shown) and from which stuffer the emulsion is extruded through the horn 1. A casing 2 is stored on horn 1 in shirred condition and, as the emulsion is extruded through the free end 3 of the horn the casing 2 is withdrawn from the horn and filled with the emulsion under pressure.

Figure 3:
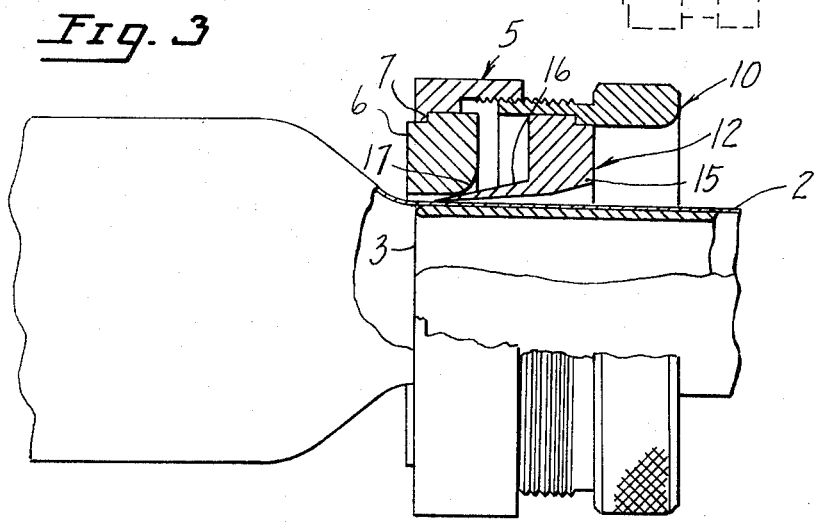
FIG. 3 is an enlarged part sectional and part elevational view of the invention showing the same in combination with the casing being stuffed.

Cooperating with the outer free end of the horn 1 is a gate, generally designated 5, which is generally rectangular in shape and provided adjacent one end with an opening which receives an annular abutment element 6 therein. The annular element 6 is formed with an outer enlarged portion which engages an annular shoulder 7 formed in gate 5 (FIG. 3).

On the opposite side of gate 5 from annular abutment element 6 is a manually manipulatable knurled externally threaded bushing 10 which is received within a threaded portion of the opening in gate 5. The inner periphery of bushing 10 is complimentrally formed relative to the outer periphery of a ring generally designated 12 so that as the bushing 10 is rotated it moves ring 12 axially toward or away from annular abutment element 6.

The ring 12 includes a main annular body portion 15 and a frustoconical extension 16 which tapers outwardly to a feather edge which is adapted to engage the outer periphery of the casing 2. As best seen in FIG. 3 the portion 16 also slants inwardly so that engagement with the casing is only at points adjacent the free end of the frustoconical portion 16.

The annular abutment element 6 is provided with a rounded portion 17 which cooperates with the outer periphery of portion 16 in a smooth sliding action. It will be apparent from FIG. 3 that, when the threaded bushing 10 is turned clockwise into the gate 5, the ring 12 is urged axially against the rounded portion 17 of abutment 6 so that the outer feather edge of the portion 16 is compressed radially inwardly against the outer periphery of casing 2. Naturally the ring 12 and abutment 6 should be formed of material that is more easily deformed than a metal so that a measurable amount of radially inward deformation of portion 16 is effected. Furthermore the material should have an extremely low coefficient of friction and have sufficient lubricity that no sudden stoppage or slowdown of the casing movement results thus obviating a sudden increase in the diameter of the stuffed sausage.

In addition, the material of said abutment 6 and especially the material of ring 12 should have good resistance to wear and optimum resilience so as to spring back to its original shape after deformation. It has been found that a tough resilient plastic such as Polytetrafluoroethylene (Teflon) is appropriate for use because its well known qualities comply with the above requirements. Teflon, which has a modulus of elasticity of about 60,000 psi, undergoes sufficient elastic deformation under load to permit the ring 12 to deform a measurable amount to make feasible the desired radially inward movement.

The gate 5 is supported for horizontal swinging at its end opposite the sizer elements on a pin 20 which is passed through a block 21 secured by screws 22 (FIG. 2) to a suitable fixed structure 24. Secured to the opposite side of block 21 from the structure 24 by means of screws 25 is a guide 26 in which is slidably received a locking element or latch 29 which is formed with enlarged ends as indicated in FIG. 1. When the latch 29 is in the position of FIG. 1 the gate 5 is held in operative position relative to the horn. However when it is desired to remove the sizer from the horn, as for example to change casings, the latch 29 is translated to the left in FIG. 1 to the position indicated by dot dash lines so that the gate may be swung to the inoperative position shown in dotted lines in FIG. 2.

Figure 4:
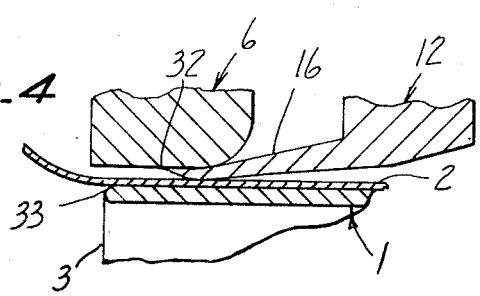
FIG. 4 is a greatly enlarged detail of the deformable ring showing the manner in which it cooperates with the casing.

The behavior of the Teflon ring 12 under load is such that it lends itself particularly to the sizing operation as best seen in the enlarged view of the working end of the frustoconical portion shown in FIG. 4. The deformation of the Teflon ring is such that the greatest loading on the casing 2 tends to be taken by the frustoconical portion at a point spaced slightly inwardly from the free edge thus causing the extremity of said portion to curl outwardly against the inner side of abutment 6 as indicated at 32 in FIG. 4. The advantage of this is that the casing may be pulled in a reverse direction toward the stuffer if desired without the free edge of the portion 16 preventing such rearward movement. Such adjusting movement may be desirable when setting up a new casing.

The advantages accruing from the use of a plastic having qualities similar to Teflon are in part due to that fact that the modulus of elasticity of Teflon is sufficiently low to obtain measurable radially inward movement against the casing and at the same time is sufficiently high to result in substantially full recovery of the plastic after the forces causing the deformation have been released. This of course is in addition to the well known characteristics of Teflon, including low coefficient of friction, lubricity, and chemical stability.

In most instances it is not necessary to change the adjustment of bushing 10 when it is desired to swing the gate 5 to the open position shown in dotted lines in FIG. 2. This is due to the relative positioning of the pivot pin 20 and the pressure point of ring 12 which is close to the discharge end 3 of horn 1. In addition, by rounding off the outer edge of said discharge end as indicated in FIG. 4 at 33, a smooth approach of the ring 12 to the end of the stuffing horn is permitted when the gate is being closed. The tapered inner side of ring 12 also provides a good lead in to facilitate closing the gate as well as permitting clearance to permit opening the gate. For these reasons no undue delay is involved in applying a new casing to the horn 1.

It is preferable to coat both the inside and outside of horn 1 with Teflon. The inside coating, reducing the frictional resistance to flow of the emulsion, substantially eliminates "smear" which, in the art, is the excessive movement of grease toward the periphery resulting in an undesirable product from the standpoint of appearance. The outer coating of Teflon enhances uniformity in the amount of drag on the casing sliding thereon and promotes a more uniform product.

I claim:

1. In a casing sizer structure for use in combination with a stuffing horn:
   an annular sizing ring surrounding said horn and the casing thereon,
   said ring being of a resilient material and formed to include a relatively thin frustoconical portion adapted to engage the outer periphery of the casing,
   adjustable means operatively associated with said ring for compressing said thin portion in a radially inwardly direction against said casing,
   said ring including an annular body portion with said frustoconical portion extending axially of said body portion and in the direction of movement of said casing,
   said adjustable means including an axially shiftable member in engagement with said ring and an annular abutment element, said frustoconical portion engaging said abutment at a point radially outwardly of the minimum diameter of said portion whereby axial movement of said member with said ring toward said abutment element compresses the free end of said portion radially inwardly of said horn.

2. A casing sizer structure according to claim 1 wherein said material has a modulus of elasticity in the order of 60,000 pounds per square inch.

* * * * *